United States Patent
Krauter et al.

(10) Patent No.: US 8,216,965 B2
(45) Date of Patent: Jul. 10, 2012

(54) HAZARDOUS PARTICLE BINDER, COAGULANT AND RE-AEROSOLIZATION INHIBITOR

(75) Inventors: Paula Krauter, Livermore, CA (US); David Zalk, San Jose, CA (US); D. Mark Hoffman, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 520 days.

(21) Appl. No.: 12/551,111

(22) Filed: Aug. 31, 2009

(65) Prior Publication Data

US 2010/0009087 A1 Jan. 14, 2010

Related U.S. Application Data

(62) Division of application No. 11/524,554, filed on Sep. 20, 2006, now Pat. No. 7,922,644.

(60) Provisional application No. 60/719,238, filed on Sep. 20, 2005.

(51) Int. Cl.
*B01J 20/22* (2006.01)
(52) U.S. Cl. ........................ 502/401; 588/401
(58) Field of Classification Search ................. 588/400, 588/401, 255, 901; 525/30; 502/401
See application file for complete search history.

(56) References Cited

U.S. PATENT DOCUMENTS

| | | | |
|---|---|---|---|
| 4,038,049 | A | 7/1977 | Melcher et al. |
| 4,042,653 | A | 8/1977 | Beyn |
| 4,070,322 | A | 1/1978 | Hwang et al. |
| 4,193,774 | A | 3/1980 | Pilat |
| 4,364,750 | A | 12/1982 | Koncz |
| 4,497,663 | A | 2/1985 | Fisher et al. |
| 5,908,377 | A | 6/1999 | Fukuda |
| 6,261,342 | B1 | 7/2001 | Rousseau et al. |
| 6,307,170 | B1 | 10/2001 | Oki et al. |
| 6,371,135 | B1 | 4/2002 | Ryskoski |
| 2003/0176302 | A1 | 9/2003 | Li et al. |
| 2004/0089156 | A1 | 5/2004 | Gartstein et al. |

FOREIGN PATENT DOCUMENTS

EP 0 668 095 A1 8/1995

*Primary Examiner* — Edward Johnson
(74) *Attorney, Agent, or Firm* — James S. Tak

(57) ABSTRACT

A copolymer and water/ethanol solvent solution capable of binding with airborne contaminants or potential airborne contaminants, such as biological weapon agents or toxic particulates, coagulating as the solvent evaporates, and adhering the contaminants to a surface so as to inhibit the re-suspension of such contaminants. The solution uses a water or ethanol/water mixture for the solvent, and a copolymer having one of several functional group sets so as to have physical and chemical characteristics of high adhesion, low viscosity, low surface tension, negative electrostatic charge, substantially neutral pH, and a low pKa. Use of the copolymer solution prevents re-aerosolization and transport of unwanted, reactive species thus increasing health and safety for personnel charged with decontamination of contaminated buildings and areas.

11 Claims, 11 Drawing Sheets

| ID | Polymer | Comonomer | Functional groups | Copolymer | MW |
|---|---|---|---|---|---|
| NS-1 | Urethane | Acrylate | IPDI-BDO; IPDI-PPG; MMA; DMPA-AMP | Dry anionic poly (urethane-coacrylate) | $4.6 \times 10^4$ |
| NS-2 | Amphoteric copolymer | triMe NH$_4$Cl | OAm; AA-AMP; BAEMA | Octylacrylamide/acrylates/butyla minoethylmeth-acrylate | $4.6 \times 10^4$ |
| NS-3 | Anionic copolymer | Vinyl acetate | VA; VND; CA-AMP | Vinyl acetate-vinyl neodecanoate crotonic acid | $4.6 \times 10^4$ |
| A-4 | Cationic copolymer | Acrylamide | Am; DADMAC | Poly(acrylamide-co-diallyl-dimethylammonium chloride) | — |
| A-5 | Cationic copolymer | Pyrrolidone | Quaternary amine | Poly(1-vinyl pyrrolidone-co-2-dimethyl-aminoethyl methacrylate), quaternized, | $1 \times 10^6$ |
| A-6 | Acrylate copolymer | Acrylamide | AA; Am | Poly(acrylamide-co-acrylic acid) (acidic flocculant) | $\sim 5 \times 10^6$ |
| A-7 | Vinyl imine | — | Primary amine | Polyethylenimine, high molecular weight, water-free | $2.5 \times 10^4$ |
| A-8 | Vinyl copolymer | pyrrolidone | Tertiary amine | Poly(1-vinylpyrrolidone-co-2-dimethylaminoethyl methacrylate) | $1 \times 10^6$ |
| A-10 | Styrenics | — | Sulfonic acid salt | Poly(sodium 4-styrenesulfonate) (anionic flocculant) | $1 \times 10^6$ |

Figure 1

| Safety Level | Solvent | Threshold Limit Value (TLV-TWA and TLV-STEL) |
|---|---|---|
| 1 | Water | No TLV |
| 2 | Ethanol | 1000 ppm (TWA) |
| 3 | Isopropanol | 500 ppm (TWA)/ 750 ppm (STEL), Limit over 30 minutes (STEL) |
| 4 | Methanol | 200 ppm (TWA) /400 ppm (STEL) |
| 5 | Cyclohexane | 100 ppm (TWA) |
| 6 | Toluene | 50 ppm (TWA) |
| 7 | n-Butanol | 20 ppm (TWA) |
| 8 | 1, 4 Dioxane | 20 ppm (TWA) |
| 9 | Benzene | 0.5 ppm (TWA)/2.5 ppm (STEL) |

Figure 2

| Formula ID | Solution Density (g/mL) | Solution Viscosity (cps) | Surface tension (dynes/cm) | Evaporation Rate[1] (mg/min) |
|---|---|---|---|---|
| 1 | 0.957 | 20 | 31.49 | 53.7 |
| 2 | 0.953 | 8 | 32.18 | 45.1 |
| 3 | 0.948 | 10 | 33.63 | 47.4 |
| 4 | 0.963 | 181 | 69.70 | 39.3 |
| 5 | 0.963 | 171 | 68.21 | 43.7 |
| 6 | 1.006 | 204 | 71.81 | 49.3 |
| 7 | 0.955 | 254 | 67.98 | 49.9 |
| 8 | 0.966 | 41 | 58.51 | 58.2 |

[1]Measured at standard room temperature (20.7 to 21.9°C) and relative humidity (34-35%)..

Figure 3

| Formula ID | pH unit | pKa | Electrostatic charge nC/g |
| --- | --- | --- | --- |
| NS-1 | 9.07 | 7.50 | 0.60 |
| NS-2 | 7.07 | 6.84 | -0.7 |
| NS-3 | 9.53 | 9.19 | -1.8 |
| A-4 | 7.71 | 5.73 | 1.77 |
| A-5 | 7.53 | 7.88 | 1.81 |
| A-6 | 7.06 | 9.14 | -0.4 |
| A-8 | 7.48 | 7.46 | 1.17 |
| A-10 | 7.39 | N/A | -0.5 |

Figure 4

| Polymer | Band cm$^{-1}$ | Band cm$^{-1}$ | Band cm$^{-1}$ | Band cm$^{-1}$ | Band cm$^{-1}$ | Band cm$^{-1}$ | Band cm$^{-1}$ | Band cm$^{-1}$ | Band cm$^{-1}$ | Band cm$^{-1}$ |
| --- | --- | --- | --- | --- | --- | --- | --- | --- | --- | --- |
| NS-1 | 1385 | 1307 | | | 1152 | 1108 | | | 530 | 515 |
| NS-2 | 1386 | 1306 | 1258 | 1245 | 1149 | 830 | 774 | 755 | 523 | 511 |
| NS-3 | 1370 | 1269 | 1255 | 1233 | 1225 | 1027 | 1123 | 1082 | 1045 | |
| A-4 | | | | | | | | | | |
| A-5 | 1470 | 1444 | 1292 | 1216 | 1168 | 1061 | 1081 | 917 | 844 | 735 |
| A-6 | 1617 | 1456 | 1418 | 1321 | 1190 | 1024 | 640 | | | |
| A-8 | | 1450 | | 1286 | | | | | | |
| A-10 | 1450 | 1412 | 1248 | 1042 | 1014 | 841 | 777 | 713 | | |

Figure 5

| Polymer | Band cm⁻¹ | Band cm⁻¹ | Band cm⁻¹ | Band cm⁻¹ | Band cm⁻¹ | Band cm⁻¹ | Band cm⁻¹ | Band cm⁻¹ |
|---|---|---|---|---|---|---|---|---|
| NS-1 | 3500 | 2961 | 2932 | 2874 | 1733 | 1559 | 1541 | 1512 |
|  | 1465 | 1401 | 1458 |  |  |  |  |  |
| NS-2 | 3387 | 2955 | 2876 | 1738 |  | 1468 | 1400 |  |
| NS-3 | 2977 | 2934 | 2875 | 1732 | 1750 | 1640 | 1567 | 1432 |
| A-4 |  |  |  |  |  |  |  |  |
| A-5 | 3456 | 2960 | 2924 | 2860 |  | 1653 | 1563 |  |
| A-6 | 3350 | 3200 | 2936 | 2359 | 2336 | 1663 | 1655 |  |
| A-8 | 3407 | 2956 |  | 2880 |  | 1667 |  |  |
| A-10 | 3360 | 3364 | 2934 | 2847 | 1650 | 1601 | 1504 |  |

Figure 6

| Formula ID | Average CFU/sample | SD |
|---|---|---|
| NS-1 | $1.1 \times 10^8$ | $5.6 \times 10^7$ |
| NS-2 | $9.7 \times 10^7$ | $3.2 \times 10^7$ |
| NS-3 | $7.0 \times 10^7$ | $9.0 \times 10^7$ |
| A-4 | $5.6 \times 10^7$ | $8.7 \times 10^7$ |
| A-5 | $8.3 \times 10^7$ | $5.2 \times 10^7$ |
| A-6 | $4.1 \times 10^7$ | $2.1 \times 10^7$ |
| A-8 | $6.8 \times 10^6$ | $1.1 \times 10^6$ |
| A-10 | $5.8 \times 10^6$ | $3.7 \times 10^6$ |
| Control, no airflow | $2.2 \times 10^8$ | $1.2 \times 10^7$ |
| Control, no copolymer | Below detection level | – |

Figure 7

|  | No Treatment CFU/sample | Water CFU/sample | NS-2 CFU/sample | NS-3 CFU/sample | A-5 CFU/sample | A-10 CFU/sample |
|---|---|---|---|---|---|---|
| Mean | $7.57 \times 10^7$ | $4.91 \times 10^7$ | $3.28 \times 10^7$ | $4.00 \times 10^7$ | $3.08 \times 10^7$ | $3.80 \times 10^7$ |
| Standard Deviation | $1.41 \times 10^7$ | $9.96 \times 10^6$ | $7.01 \times 10^6$ | $1.02 \times 10^7$ | $1.20 \times 10^7$ | $7.88 \times 10^6$ |
| Sample Size | 8 | 8 | 8 | 8 | 8 | 8 |
| SEM | $4.97 \times 10^6$ | $3.52 \times 10^6$ | $2.48 \times 10^6$ | $3.60 \times 10^6$ | $6.01 \times 10^6$ | $2.79 \times 10^6$ |
| 1-[$CFU_{Treated}/CFU_{No\ Treatment}$] | – | 35 | 57 | 47 | 59 | 50 |

Figure 8

|  | No Treatment | Water CFU/sample | NS-2 CFU/sample | NS-3 CFU/sample | A-10 CFU/sample |
|---|---|---|---|---|---|
| Mean | 141 | $3.1 \times 10^3$ | $3.30 \times 10^4$ | $5.0 \times 10^3$ | $1.60 \times 10^4$ |
| Standard Deviation | 341 | $3.5 \times 10^3$ | $1.36 \times 10^4$ | $3.9 \times 10^3$ | $1.31 \times 10^4$ |
| Sample Size | 8 | 8 | 8 | 8 | 7 |
| SEM | 120 | $1.2 \times 10^3$ | $1.4 \times 10^3$ | $1.4 \times 10^3$ | $4.9 \times 10^3$ |
| 95% CI min | 143 | 139 | 1769 | $1.5 \times 10^3$ | $3.9 \times 10^3$ |
| 95% CI max | 426 | $6.0 \times 10^3$ | $8.2 \times 10^3$ | $8.2 \times 10^3$ | $2.8 \times 10^4$ |
| Minimum | 0 | 600 | 900 | $1.0 \times 10^3$ | $6.0 \times 10^3$ |
| Maximum | 983 | $1.12 \times 10^4$ | $4.27 \times 10^4$ | $1.27 \times 10^4$ | $3.52 \times 10^4$ |

Figure 9

| Test | Copolymers with greatest spore adhesion |
|---|---|
| 1 – Initial screening | NS-1, NS-2, NS-3, A-4, A-5, A-6 |
| 2- Spore resuspension | NS-2, NS-3 |
| 3- Filed test, adhesion efficiency | NS-2, A-5 |
| 4- Field test, dried copolymer | NS-2 |

HAZARDOUS PARTICLE BINDER, COAGULANT AND RE-AEROSOLIZATION INHIBITOR

CROSS-REFERENCE TO RELATED APPLICATIONS

This application is a divisional of prior application Ser. No. 11/524,554 filed on Sep. 20, 2006 now U.S.Pat.No.7,922,644, entitled "Hazardous Particle Binder, Coagulant and Re-Aerosolization Inhibitor", which is incorporated herein by reference.

I. CLAIM OF PRIORITY IN PROVISIONAL APPLICATION

This application claims priority in provisional application no, 60/719,238, filed on Sep. 20, 2005, entitled "Airborne Small-particle Binder and Reaerosolization Inhibitor" by Paula Krauter et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to hazardous particle containment, and more particularly to a copolymer and solvent solution capable of binding and coagulating hazardous aerosol and aerosolizable particles, such as *B. anthracis* spores, and other small particles less than 10 μm in size to immobilize and inhibit re-aerosolization and transport thereof.

III. BACKGROUND OF THE INVENTION

The rapid containment, de-contamination, and restoration of a building, facility, or other area involved in a hazardous material or terrorist incident, such as involving a biological weapon agent or a "dirty bomb," is considered vital for the protection of the public health and welfare. In bringing such affected buildings and areas back into service during decontamination and restoration, however, a real concern is the re-suspension and further dispersion of the toxic, infectious, or otherwise hazardous particles due to particle dynamics and airflow patterns, especially the airflow patterns in buildings and in the building ventilation systems. This re-aerosolization can result in more extensive and higher concentrations of contamination in the air, which can require multiple decontamination efforts and increase the time and cost of the source reduction and cleanup process. Moreover, such particle transport and the lack of mass balance due to such airflow patterns combine to make reentry into a contaminated area dangerous for emergency and remediation personnel.

Re-aerosolization is especially problematic where the hazardous contaminant is a very small particle less than 5 μm in size, such as *B. anthracis* spores, since such particles are readily aerosolizable, have an ability to remain airborne (aerosols with a particle size of 0.1 to 1 μm tend to remain suspended), and can achieve significant diffusive motion in much the same fashion as for gas molecules. Weaponized *B. anthracis* spores in particular, are very small refined particles which are uniform in size and appearance (approximately 1 to 3 μm in size), highly concentrated, electrostaticly charged, and treated to reduce clumping. Due to their very small size and ability to remain airborne, weaponized *B. anthracis* spores are more likely to be inhaled and are thus considerably more lethal than unrefined spores. Furthermore, these spores have been shown to re-aerosolize with common office activities such as paper handling and foot traffic.

What is needed therefore is a tool, composition, and/or methodology that will rapidly immobilize or otherwise inhibit the re-aerosolization and further transport of hazardous threat agents. Because the inhibition of secondary aerosolization and migration of biothreat particles has important implications for public health protection and contamination cleanup, limiting further dispersion would reduce the health risk of inhaling hazardous particles during decontamination and restoration of a facility, reduce the cost of the decontamination and restoration process, and enhance remediation efficiency overall.

IV. SUMMARY OF THE INVENTION

One aspect of the present invention includes a copolymer solution comprising: a solvent selected from the group consisting of water, and ethanol and water mixture; and a copolymer dissolved in said solvent, said copolymer having a functional group set selected from the group consisting of the following functional group sets: (1) IPDI-BDO, IPDI-PPG, MMA, and DMPA-AMP; (2) OAm, AA-AMP, and BAEMA; (3) VA, VND, and CA-AMP; (4) Am and DADMAC; (5) Quaternary amine; (6) AA and Am; (7) Primary amine; (8) Tertiary amine; and (9) Sulfonic acid salt, for coagulating aerosol and aerosolizable particles and adhering said particles to a surface to inhibit re-suspension and transport thereof.

Another aspect of the present invention includes a copolymer solution comprising: a solvent selected from the group consisting of water, and ethanol and water mixture; and a copolymer dissolved in said solvent so that said copolymer solution has low viscosity of less than 50 cps and low surface tension of less than 60 dynes/cm, for coagulating aerosol and aerosolizable particles and adhering said particles to a surface to inhibit transport and re-suspension thereof.

Another aspect of the present invention includes a copolymer solution for binding small particles comprising: a solvent characterized by an evaporation rate; and a copolymer dissolved in said solvent, said copolymer capable of binding to small particles less than 10 microns, coagulating to become tacky as said solvent evaporates, and adhering said small particles to a surface so that transport and re-suspension of said small particles is inhibited from said surface.

Another aspect of the present invention includes a method of inhibiting re-aerosolization and transport of aerosol and aerosolizable particles, comprising: applying a copolymer solution to said particles, said copolymer solution comprising: a solvent selected from the group consisting of water, and ethanol and water mixture; and a copolymer dissolved in said solvent so that said copolymer solution has low viscosity of less than 50 cps and low surface tension of less than 60 dynes/cm, for coagulating aerosol and aerosolizable particles when applied thereon and adhering said particles to a surface.

Generally, the present invention is a set of nine copolymer and solvent solutions for use as a small particle binding, coagulant, adhesion, encapsulant, and containment tool for preventing the re-aerosolization of bio-threat agents, such as weaponized spores, and other hazardous particles after incident occurrence. The copolymer solutions are of a type having key characteristics such as high adhesion, high elasticity, low density, short drying-time, low viscosity and low surface tension. The copolymer solutions were developed for the purpose of immobilizing aerosolized less than 10 μm sized hazardous particles, including biological agents, spores, etc.

such as may be deployed as a weapon in a bioterrorist attack, and toxic metals, such as may be produced by a "dirty bomb." It is appreciated, however, that in addition hazardous particles, non-hazardous particles, such as allergens, may also be targeted for removal and immobilization using the present invention.

Nine film-forming copolymers having multiple functional groups capable of attracting and binding particles were selected to be combined with appropriate solvents to design solutions that met specific performance objectives. In particular, the copolymer solutions of the present invention are formulated based on the chemical, physical, and biological properties of hazardous agents to ensure attracting, binding, and adhering hazardous particulates to surfaces to inhibit their re-suspension and transport. Preferably, the copolymer solution uses a high molecular weight co-polymer for strength and tackiness. Additionally, the copolymer solution uses a copolymer which produces a low solution viscosity for sprayability of the copolymer solution. A potential feature of the copolymer solutions of the present invention is the ability to aerosolize the binding agent into the zone of interest and increase time of suspension in order to attach to the target contaminant. The low viscosity ($\geq$4% polymer solids) will allow fine atomization of the formula achieving small spray particles. This invention will bind with small particles (<5 μm) such as toxic spores and remove them from the breathing zone by binding them to surfaces in a tacky-film. The binding material will stick the small particles (spores or microorganisms or contaminants) to surfaces in a manner that will inhibit re-aerosolization. If the polymer system is applied as anionic, its surface activity will readily bind the cationic particulate such as weaponized spores. And in order to tightly bind the hazardous particles to the environment surfaces, the polymer films must have high levels of adhesion. The copolymer contributes properties such as bond strength and sprayability, important for polymer dispersal and for the inhibition of re-suspension. The polymer solution will dry into a strong film that will hold the embedded agent and prevent re-aerosolization of minute particles including but not limited to hazardous biological, radiological and chemical particulate.

The copolymer solutions of the present invention are produced used select film-forming copolymers that have multiple functional groups capable of attracting and binding particles; these include for example acrylates, cellulosics, vinyl copolymers and polyurethanes. The selected copolymers were combined with appropriate solvents, such as water or ethanol/water mixture, to design copolymer solutions that met specific performance objectives. The solutions were then evaluated for key characteristics such as high adhesion, high elasticity, low density, short drying-time, low viscosity and low surface tension. These solutions were also evaluated for their adhesion to biothreat agents in a series of wind tunnel experiments using highly refined aerosolized *Bacillus atrophaeus* spores (a simulant for anthrax, 1-3 μm). Multiple tests of the characteristics of the formula including adhesion strength, elasticity, density, drying-time, viscosity, pH, surface tension and the copolymer's performance in wind tunnel tests indicate the product's effectiveness against highly refined aerosolized *Bacillus atrophaeus* spores, a simulant for anthrax spores. Of the nine copolymer solutions of the present invention, the adhesion test results demonstrated that two copolymer solutions in particular exhibited the best performance for attaching to sopores and inhibiting re-aerosolization. The copolymer solutions were anionic,thus providing the electrostatic (coulombic)attraction to cationic spores, had low surface tension for spraying application, and performed well in wind tunnel tests.

Airborne contaminants such as, but not limited to, toxic metals, microbiological contaminants, and allergens could also be removed from the breathing environment in this way. As an example, particles can include a coating that acts to separate them, resulting in spacing too large for van der Waals forces to cause the particles to adhere and thus aggregate and deposit onto surfaces. Various contaminants are of a sufficiently small size (0.5-5 μm) to lodge in the lung tissue, remain in the breathing zone and readily re-suspend. Applications include binding of airborne particles that could travel into, out of, and re-circulate within facilities such as buildings and metro stations.

During a biothreat response, the solution would be applied or delivered by various means, such as by fogging, nebulizing, spraying into the air or onto surfaces, or rolling, brushing, etc. It operates to knock down and lock down particles thus inhibiting their transport or inhalation, or simply lock down particles already on a surface. The copolymer solutions will cause target particles to coagulate and form a particle large enough to be influenced by gravitational forces and furthermore, once deposited, will stick to the surface on which the particle lands. The solutions can be used as part of a primary response or remediation team for suspected biological weapon response from the workplace to the battlefield. It can also be applied to particulate isolation requirements relating to post-detonation "dirty bomb"contamination. This product can be deployed to reduce the spread of contaminants and protect our troops and emergency responders.

V. BRIEF DESCRIPTION OF THE DRAWINGS

The accompanying drawings, which are incorporated into and form a part of the disclosure, are as follows:

FIG. 1 is a table of nine functional group sets and corresponding copolymers from which to select for use in nine exemplary embodiments of the copolymer solution of the present invention.

FIG. 2 is a table of various solvents and their threshold limit values (TLV), including water and ethanol used in the copolymer solution of the present invention.

FIG. 3 is a table of various physical characterizations of eight exemplary embodiments of the copolymer solutions of the present invention.

FIG. 4 is a table of various chemical characterizations of the eight copolymer solutions of FIG. 3.

FIG. 5 is a table of infrared peaks between 1300-900 cm$^{-1}$, chemically verifying by infrared spectroscopy the polymers corresponding to the eight copolymer solutions of FIG. 3.

FIG. 6 is a table of infrared peaks between 4000-1300 cm$^{-1}$ chemically verifying by infrared spectroscopy the polymers corresponding to the eight copolymer solutions of FIG. 3.

FIG. 7 is a table of the results from a first adhesion test for initial screening of the eight copolymer solutions of FIG. 3.

FIG. 8 is a table of the results from a third adhesion test of four copolymer solutions NS-2, NS-3, A-5, and A-10.

FIG. 9 is a table of the results from a fourth adhesion test of three copolymer solutions NS-2, NS-3, and A-10.

FIG. 10 is a table summarizing the results of the four adhesion tests.

Figure 12:
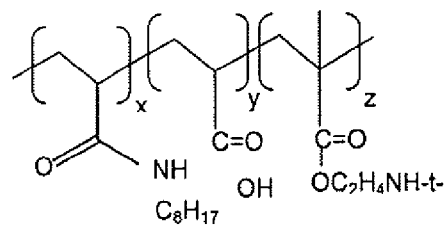
Figure 13:
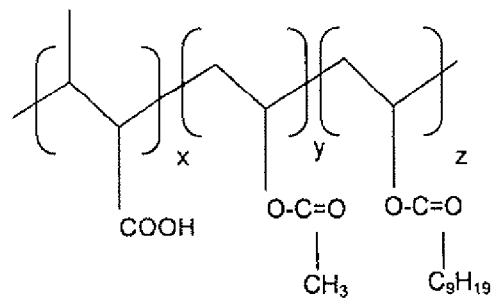
Figure 14:
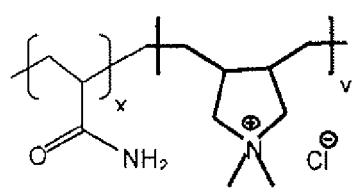
Figure 15:
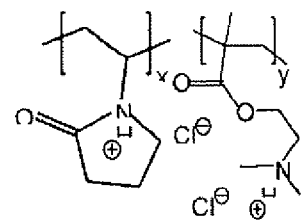
Figure 16:
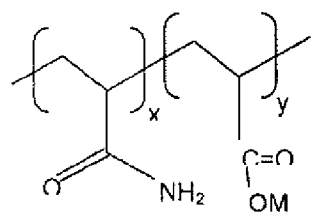
Figure 17:
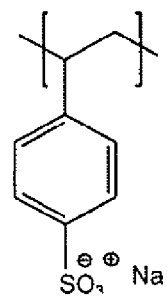

FIG. 11 is a chemical formula of the NS-1 copolymer.
FIG. 12 is a chemical formula of the NS-2 copolymer.
FIG. 13 is a chemical formula of the NS-3 copolymer.
FIG. 14 is a chemical formula of the A-4 copolymer.
FIG. 15 is a chemical formula of the A-5 and A-8 copolymers.
FIG. 16 is a chemical formula of the A-6 copolymer.
FIG. 17 is a chemical formula of the A-10 copolymer.

Figure 18:
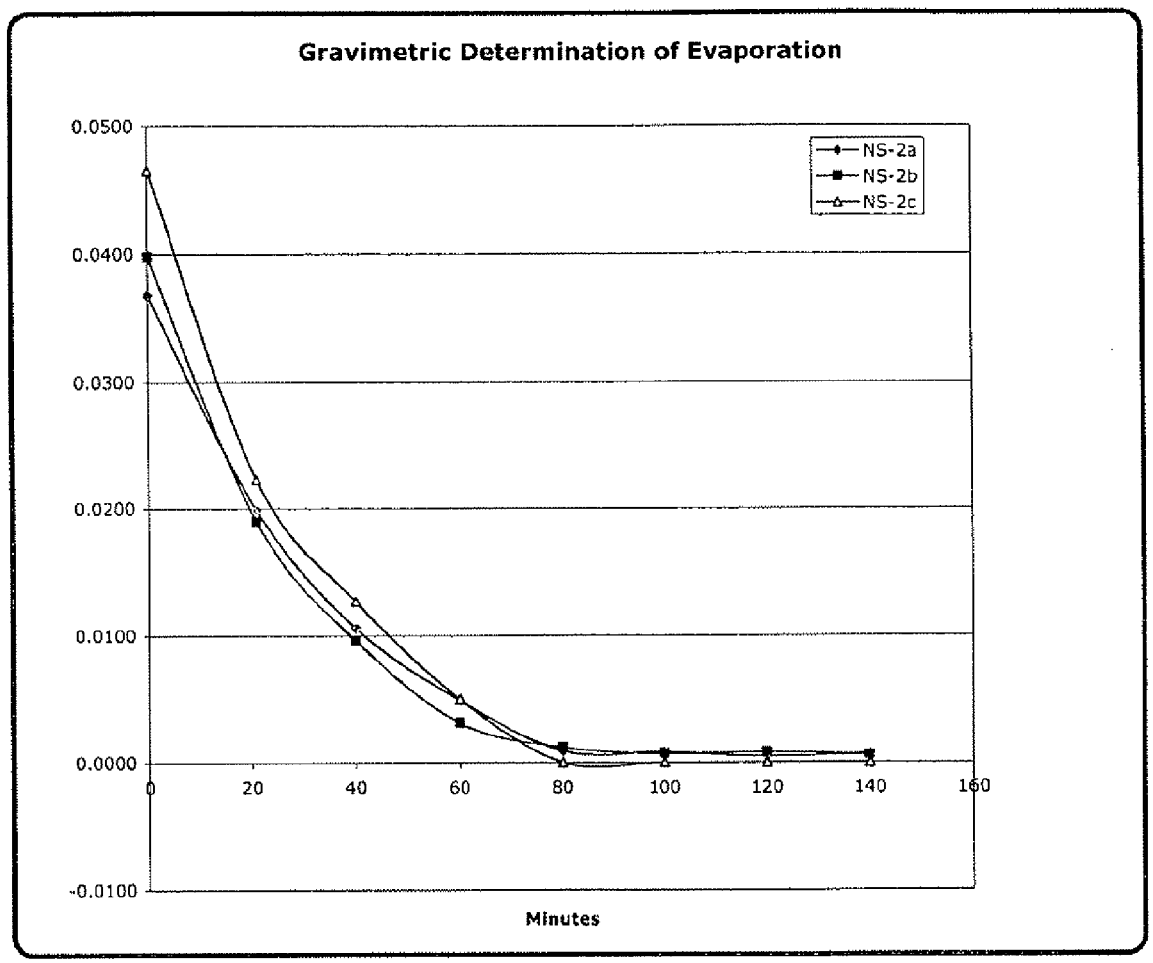

FIG. 18 is a graph showing NS-2 evaporation over an exemplary time period of 140 minutes.

Figure 19:
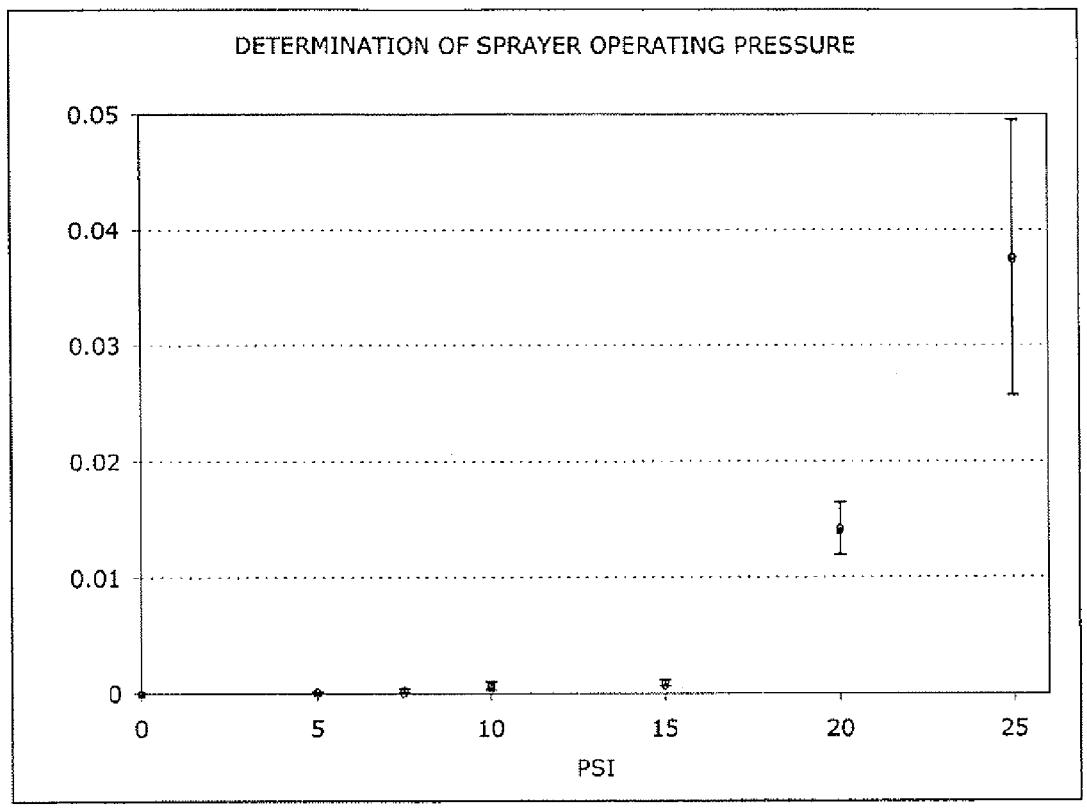

FIG. 19 is a graph showing the determination of appropriate sprayer operating pressure.

Figure 20:
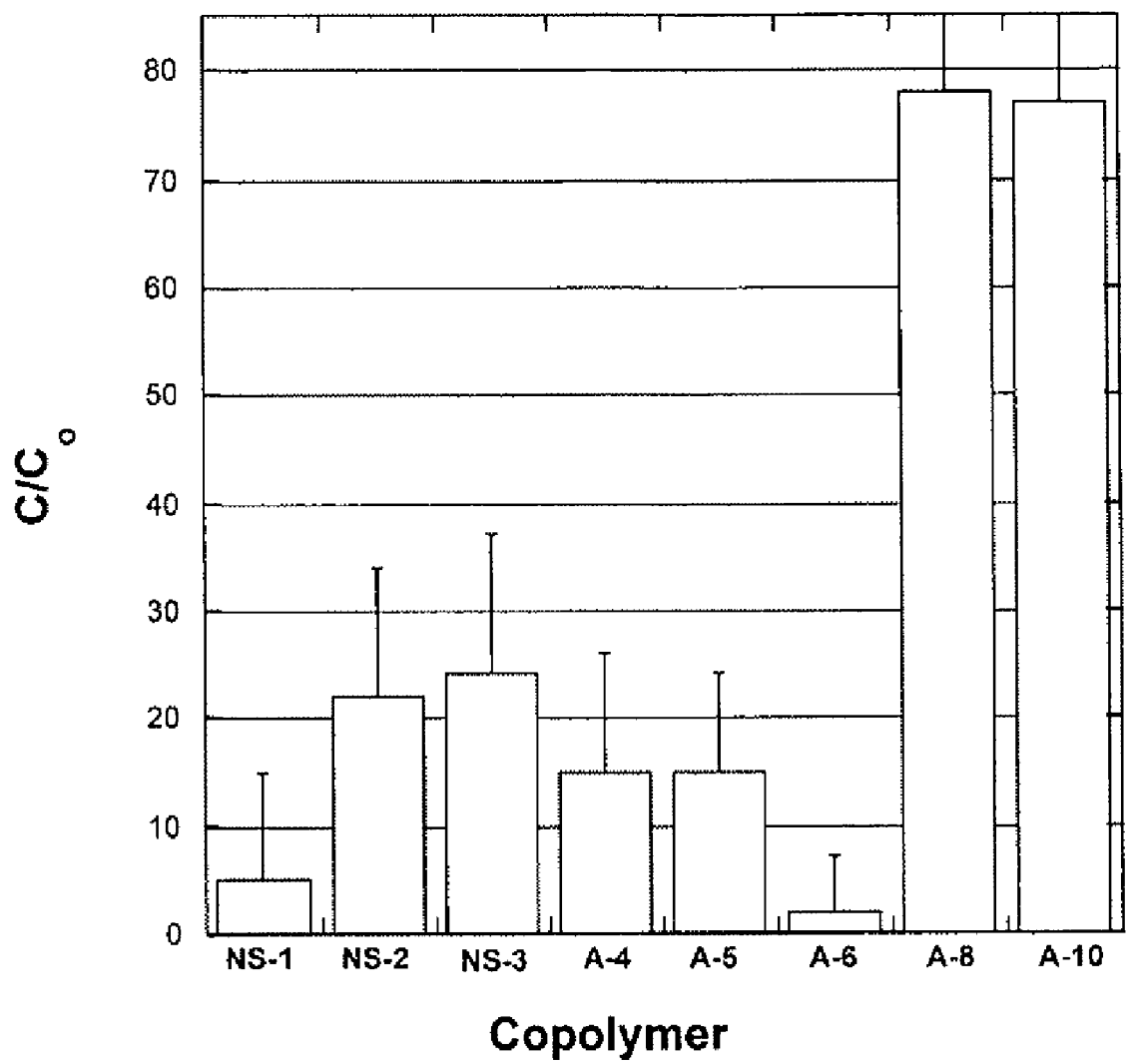

FIG. 20 is a graph showing the adhesion strength screening test results for copolymer solutions and controls.

Figure 21:
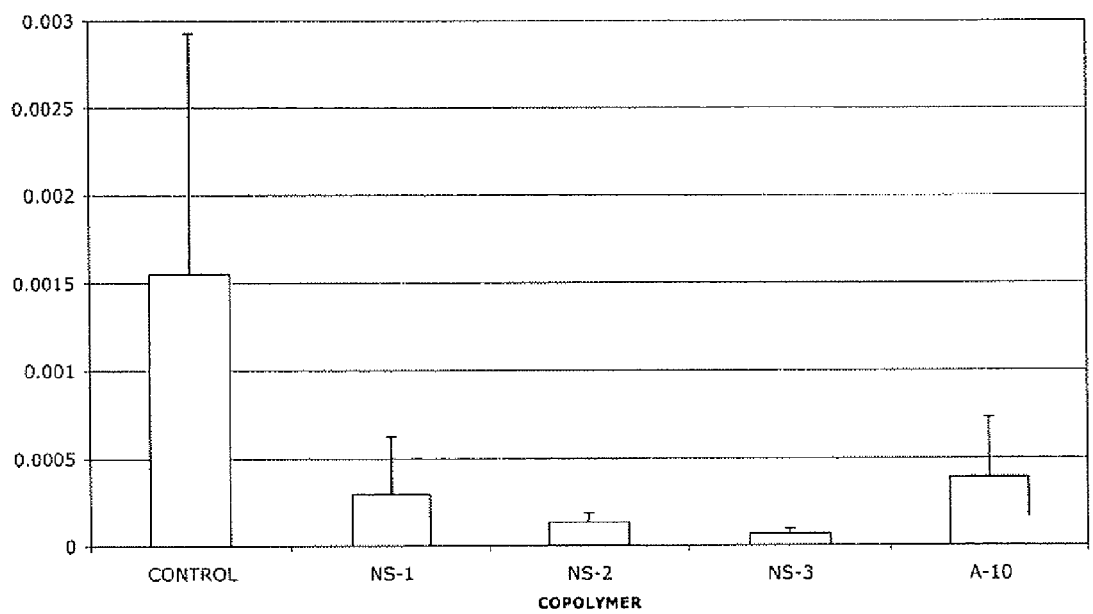

FIG. 21 is a graph showing re-suspension ratios for copolymer solutions and controls.

VI. DETAILED DESCRIPTION

Nine different copolymer solution formulations of the present invention were developed based on the structural and functional group characteristics of nine different copolymers which were selected and used in the formulations. The nine different functional group sets exhibit various desirable characteristics for binding, coagulating and immobilizing/inhibiting particle transport and re-aerosolization. FIG. 1 shows a table listing the nine preferred copolymers used in the copolymer solutions of the present invention, along with the associated functional group set, polymer, comonomer, and copolymer molecular weight (MW). ID labels are used to identify the respective copolymer solutions and their associated copolymers and functional group sets, including NS-1, NS-2, and NS-3 obtained from National Starch and Chemicals, Inc. based in Bridgewater, N.J., and A-4, A-5, A-6, A-7, A-8, and A-10 obtained from Aldrich Chemicals based in Milwaukee, Wis.

As shown in FIG. 1, NS-1 includes the functional groups: urethane hard segment of butane diol and isophorone diisocyanate (IPDI-BDO), urethane soft segment of isophorone diisocyanate and polypropylene glycol (IPDI-PPG), methylmethacrylate (MMA), and dimethylol propanoic acid amide of 2-amino-2-methyl-1-propanol (DMPA-AMP). NS-2 includes the functional groups: Octylacrylamide(OAm), acrylic acid amide of 2-amino-2-methyl-1-propanol (AA-AMP), and Butylaminoethyl methacrylate (BAEMA). NS-3 includes the functional groups: vinyl acetate (VA), vinyl neodecanoate (VND), and Crotonic acid amide of 2-amino-2-methyl-1-propanol (CA-AMP). A-4 includes the functional groups: Acrylamide(Am), and diallyl-dimethylammonium chloride (DADMAC). A-5 includes the quaternary amine functional group. A-6 includes the functional groups: acrylic acid (AA), and Am. A-7 includes the primary amine functional group. A-8 includes the tertiary amine functional group. And A-10 includes the sulfonic acid salt functional group.

Furthermore, the nine preferred copolymer solutions were comparatively evaluated against each other to determine which of the nine were more suitable for binding/attracting, coagulating, and adhering particles. In particular, the primary objective of the comparative testing was to determine which of the nine copolymer solutions performed best in attracting biothreat agents, such as *B. anthracis* spores, in air and on surfaces, coagulating them into particulate aggregations large enough to settle on the ground, and finally immobilizing the particles to remain on the ground.

Copolymer Evaluation and Selection

In selecting the nine copolymer selections used in the nine copolymer solution designs of the present invention, physical and chemical parameters inherent to copolymer classes were first used. The chemical parameters included selecting copolymer candidates that functionally possessed one or more of the following: an ability to form a strong film, effectively interact with metal ions, or adhere well with proteins. Physical criteria included selecting anionic comonomers and varying molecular weight. Other criteria included strong adhesion, stability, ease of application, and solubility in environmentally friendly solvents.

The capacity of a copolymer solution to form a strong film is a means to immobilize the biothreat particle on surfaces. Copolymers that form strong films include: acrylics, cellulosics, vinyl copolymers (e.g., styrene sulfonate, polyvinyl acetate-co-crotonate or vinyl pyrrolidone) and acrylate-silicone and polyurethane-acrylate combinations. Many of these aforementioned copolymers are also flocculants capable of binding to particles by van der Waals, coulombic, or steric interactions. Another desirable characteristic of some copolymers is their ability to interact effectively with metal ions. This characteristic is important for coating ventilation ducting and other metal components within a facility contaminated with the biothreat agent. Examples of these copolymers include copolymers of 1-vinyl-2-pyrrolidone and acrylamide derivatives.

Several copolymers were selected because of their adhesive properties to proteins, especially keratin, which is similar to the exosporm coating of the *bacillus*. Since the bacterial spore coat can contain high concentrations of glycoprotein including keratin, copolymers used in the hair styling industry were evaluated. These included acrylates and vinyl acetate.

Because aerosolizable spores tend to be positively charged, anionic copolymers based on the tribo-electric series were selected. Some of the copolymer formulas have multiple functional groups that potentially will bind the spore or particles more efficiently than other formulations due to a desirable negative charge.

Where available, copolymers of different molecular weights were evaluated because this property controls solution viscosity and sprayability. FIG. 1 lists the chemical structures of the monomer units for the copolymers investigated in this effort.

Solvent Selection and Solution Formulation

The next step in designing copolymer solution formulations for the immobilization of biothreat particles, was the selection of appropriate solvents to dissolve the copolymer. An important criterion for choosing an appropriate solvent is its capacity to maximize copolymer dissolution. Organic solvents typically dissolve high concentrations of polymer. However, although maximum copolymer solubility was a primary factor in solvent selection, other criteria were also important, such as selecting solvents with a minimum surface tension and high evaporation rate. A reduced surface tension allowed the solution to better wet and fully cover the surface. And an increased evaporation rate has the advantage of decreasing drying time.

Also critical to the selection process was choosing solvents that minimize environmental impact, waste disposal issues, and meet relevant environmental regulations (for example, U.S. Environmental Protection Agency [EPA] and National Institute for Occupational Safety and Health [NIOSH] regulations). The American Conference of Governmental Industrial Hygienists' (ACGIH) guidelines for occupational exposure levels were used to evaluate the solvents. Both time-weighted average and short-term exposure limit Threshold Limit Values (i.e., TLV-TWA and TLV-STEL) were evaluated, when available. The TLV for solvents evaluated for use in solutions for this study are ranked in FIG. 2. In the absence of a stated STEL, a value of three times the TLV-TWA is used. The TWA provides a guideline for a safe average value of allowable exposure over the course of an eight-hour workday and for a five-day work week. A STEL is not an independent exposure limit but rather supplements the TWA. A STEL is designated for substances that cause acute health effects with a short-term (acute) exposure, although the substance demonstrates toxic effects over the long-term (i.e., chronic).

Various candidate solvents for use in the copolymer solution of the present invention are listed in FIG. 2 and were evaluated to select those with minimal potential environmental and health effects. The hazardous nature of several solvents (such as benzene and methanol) precluded their use for any formulation. Solvents with less desirable exposure limit such as isopropanol, cyclohexane, toluene, n-butanol and 1,4 dioxine were not used.

Ultimately, all nine formulations developed in the present invention used either water or a water and ethanol mixture as a solvent, primarily due to the need for minimizing occupational health and safety risks. During the emergency response phase of a biothreat incident the application of a solution developed with a water or ethanol solvent is beneficial. Product application would only necessitate workers use a respirator for aerosol protection from the hazardous particulate (e.g., a P100 or high-efficiency particulate air [HEPA] filter). For these reasons, most of the copolymers were formulated in a 33:67 ethanol to water solution, or approximately 1:2. Some formulations required a small addition of a base (i.e., 2-amino-2-methyl-1-propanol [AMP]) to react with acidic comonomers and enhance the overall copolymer solubility, (See FIG. 1).

Copolymer and Solution Characterization

The physical and chemical characterization of the nine copolymer solutions are listed in the tables shown in FIGS. 3 and 4. These characterizations included measurements of the following attributes: surface tension, viscosity, pH, solids content, electrostatic charge, evaporation rate, chemical verification by infrared spectroscopy (FIGS. 5 and 6), and ionization constant. These physical and chemical properties of the nine formulas were used to refine the set that would undergo further testing through adhesion experiments. In particular, to optimize the solution for spray application, solutions exhibiting low viscosity and surface tension were favored.

Solutions with reduced surface tension allow for more thorough wetting of treated surfaces and a potential enhanced capacity to immobilize the biothreat particles. The optimum surface tension for these solutions was less than 50 mN/m. Three copolymer solutions (NS-1, NS-2 and NS-3) demonstrated surface tensions between 30 and 33 mN/m (FIG. 3); these solutions used an ethanol solvent and a surfactant. Addition of ethanol to aqueous solutions improved wetting characteristics. The water-based solutions had higher surface tensions than the optimal range (data not shown).

The solutions' droplet size scales directly with their surface tension. For example, small droplet size is associated with a low liquid surface tension. Low solution viscosity formulations spray more easily, while high viscosity formulations are more difficult to spray. An optimal value for solution viscosity is approximately 80 cps or less. Solution viscosities above this range were difficult to use in commercially available paint sprayers and less desirable for this application. Surface tension and electrostatic charge measurements indicated that NS-2 and NS-3 should make superior formulations for binding to the keratin-like surface structures of spores. Also, their solution viscosity suggests that NS-2 and NS-3 will spray well. In contrast, the A-7 copolymer was excluded from further testing based on its extremely viscous nature for spraying applications i.e. polyethylenimine. It is appreciated, however, that A-7 may be used in an embodiment not requiring spraying application, such as rolling or brush applications.

The rate of evaporation for formulation solvents was determined gravimetrically. The solvents evaluated were water and ethanol and copolymer formulas NS-1, NS-2, NS-3, A-4, A-5, A-6, A-8 and A-10. A small amount of sample (50 µL) was loaded onto a tarred glass slides (replicates of 3) and weighted at 20-minute intervals. A desirable material will dry in a short time period at standard room temperature and relative humidity but will not become solid while being sprayed or while in the air. Three evaporation rate curves were generated for each copolymer solution (FIG. 18 shows NS-2). The slope of the lines between 20 and 40 minutes was used for each copolymer solutions' evaporation curve to determine the rate of evaporation. The evaporation rate of the copolymer solutions tested ranged from 39.3 to 58.2 mg/min at ambient (20.7 to 21.9° C.) and relative humidity (34-35%). A-10 dried quickest (58 mg/min) and A-4 dried the slowest (39 mg/min). The evaporation rate did not relate directly with solution viscosity or density as shown in FIG. 3.

The polymer solutions' pH, shown in FIG. 4 indicate the degree of their hydrogen ionization. Acid groups in the NS series of copolymer solutions were neutralized with a base to enhance their solubility. This resulted in higher pH values. However, NS-2 was amphoteric and had an almost neutral pH. The Aldrich (A) series of copolymer solutions had varying pH depending on their copolymer composition (FIG. 1). Acrylamides (A-4 and A-6) were weakly basic. The vinyl pyrrolidone copolymers (A-n and A-8) were very slightly basic. The sodium salt of the strong acid poly(styrene sulfonate, A-10) is also slightly basic. A neutral pH copolymer formula may be more desirable for surface application due to the non-corrosive properties of neutral solutions.

The electrostatic charge of each copolymer was measured in order to determine which retained the most negative charge. Negative electrostatic charge is desirable to attract the positively charged spores. Static measurements were obtained using a JCI 140 Static Monitor and Faraday pail (John Chubb Instruments, Cheltenham, England). This instrument had a level of detection of 0.01 nC. The greater the electrostatic charge of the copolymer the higher the attractive force on positively charged spores. Negative electrostatic charge is desirable because coulombic interactions occur over long ranges than van der Waal or steric interactions. The electrostatic measurements demonstrated that the copolymers NS-2, NS-3, A-6 and A-10 might be superior to other copolymers in spore attraction (FIG. 4).

To verify monomer structures for these polymers an infrared (FT-IR) spectrum from a Nicolet 730 spectrometer was taken. Polymers were either analyzed as cast, free-standing thin films or pressed in potassium bromine pellets, if sufficiently thin films could not be obtained. Major absorbance peaks were compared with known values from the literature. Spectra were subtracted against background in air from 400 to 4000 $cm^{-1}$. FIG. 5 contains peak positions from the "finger print" region (1300-900 $cm^{-1}$). FIG. 6 contains peaks between 4000-1300 $cm^{-1}$). Peaks in the 4000-2800 $cm^{-1}$ region are associated with asymmetric and symmetric stretching of hydrogen atoms, such as CH, NH, OH, and $H_2O$. Peaks in the 1700-1400 $cm^{-1}$ region are associated with functional group stretching and bending absorptions. Confirmation of the functional groups shown in FIG. 1 can be made based on peaks in this region.

Dissociation constant (pKa) titrations were conducted to determine the extent to which copolymer acid groups dissociate in solution into their component parts potentially allowing monomer active sites to be in solution. The potentiometric method was used to titrate the acid with a base of known concentration and the pH followed with a pH meter. The midpoint of the pH versus base concentration is the pKa value of the weak acid. In the NS-3 copolymer solution, only crotonic acid contributed to the titration. In the NS-1 copolymer solution, dimethylolpropanoic acid was the main contributor. However, for this solution, the effects of secondary amines attached to the isophorone ring directly or one carbon away on the urethanes, may have influenced the result. In summary, these results demonstrate that some solutions ionize more readily and potentially attract positively charged spores. Solutions that ionize more readily than others include A-4 and NS-2. Results are given in FIG. 4.

Several copolymer formulations had desirable characteristics including low viscosity, low surface tension, neutral pH, low $pK_a$ and a negative electrostatic charge. Copolymer solutions NS-1, NS-2, NS-3 and A-10 all had favorable solution characteristics. Of the original nine copolymer-formulations, eight were evaluated in additional spore adhesion tests discussed next.

Summary of Four Adhesion Tests

Four adhesion tests were conducted to assess the adhesive strength of the various copolymer solution formulations of the present invention. These tests reveal the functional and performance advantages of these copolymer solution formulations over the other copolymer solution formulations, for coagulating, and inhibiting re-aerosolization and transport of small aerosol and aerosolizable bio-particles.

Test One was a screening test in which eight copolymer solutions were evaluated (excluding A-7) based on 1) particle adhesion to the copolymer and surface and 2) physical performance measures such as sprayability, contact angle and drying time. Test two differed from the first screening test in that the spores were atomized onto glass sample surfaces and adhesion was measured by counting resuspended particles. Test three and four took place at the U.S. Army's Dugway Proving Grounds (DPG) in Utah, and compared the adhesion strength on fluidized spores released in a mock-office environment (Test Three) and in a wind tunnel (Test Four).

A surrogate organism for *B. anthracis*—the bacterium *B. atrophaeus* which is also known as *B. globigii* (BG)—was used in all four tests for this study. Fluidized *B. atrophaeus* spores are reasonable facsimiles of weaponized spores. *B. atrophaeus* is a gram-positive, durable, spore-forming bacterium that is common in certain soils, noninfectious, easily grown in culture, and easily detected. The spores used in this study were in a dry powder form ($2.33 \times 10^{11}$ spores/g) that was characterized by scanning electron microscopy and by a 6-stage, viable, Andersen impactor (Thermo Andersen, Waltham, Mass.) and an Aerodynamic Particle Sizer (APS 3200, TSI Inc., Shoreview, Minn.) when in the aerosol state. Dried spores were prepared and characterized by scientists at DPG. Spore diameters predominantly ranged from 0.9 to 1.1 μm in three separate analyses.

Test One: Initial Screening of Copolymer Adhesion to Spores

Preliminary performance testing demonstrated that all of the copolymer solutions adhered well to particles at low flows (<3.9 m/min). In order to differentiate between the eight copolymer solutions, both their wetting characteristics and adhesion performance at high shear stress required evaluation. The evaluation of wetting characteristics involved spraying a volume of the copolymer solution that did not completely coat the sample surface. Approximately 50% of the surface was coated. Sample coupons used were of 1.27 cm² galvanized steel that were pre-cleaned with successive ethanol washing then baked for 1 hour at 90° C. Each of the eight copolymer solutions were evaluated, along with two control sample sets.

A known quantity of *B. atrophaeus* spore powder was measured onto the surface center of eight steel coupons. Copolymer formulas from FIG. 1 were sprayed (1.6 mL) from a distance of 30.5 cm using an air b rush (Thayer & Chandler, Model 8219AA, Franklin Park, Ill.) fixed in an air chamber inlet such that the brush nozzle pointed perpendicular to the slide below it. The air brush was connected to a compressed air line and operated at 10-12 psi. Each copolymer was sprayed onto eight 1.27 cm² galvanized steel coupons and allowed to dry completely. Controls included a series of coupons that received no treatment and another set that was sprayed with ultra-pure water (1.6 mL). Each copolymer and control set included 8 individual coupon samples. Ambient temperature and relative humidity were recorded.

After the copolymer solution was sprayed and dried, the samples were placed 60 cm away from a high-speed fan (velocity of 46.6-52.4 m/min). Air blew across the slides for a 5 min drying time. Particle loss was assessed by gravimetric measurement and by standard culturing techniques. For gravimetric measurements, the coupons were weighed before spores were deposited, after spores were deposited, after polymer application and after exposure to the airflow. The coupons were then placed in test tubes containing 10 mL of deionized water and underwent a 30 sec vortex. Aliquots of the diluent were serial diluted and plated onto trypticase soy agar (TSA) and incubated for 24 h at 37° C. Spores that germinated and grew were those encapsulated by the copolymer solution droplets.

Test Two: Aerosolized Spore Resuspension

The aerosolized spore resuspension test differed from the spore adhesion screening test—an evaluation of bulk resuspension—in that this test measured spores singly. In this second test, the spores were nebulized onto a glass sample surface and adhesion was measured by counting resuspended spore particles with an APS 3200 (TSI Inc., Shoreview, Minn.). The APS counted particles ranging from 0.45 to 30 μm in diameter and binned counts into 59 discrete sizes. The testing was conducted in a 0.47 m³ wind tunnel (0.45 m×0.45 m×2.30 m). The wind tunnel was operated with a HEPA-filtered supply and exhaust air, with the chamber maintained under negative pressure during operation. The wind tunnel was used to both enclose the apparatus that aerosolized the biological material and to provide a static environment for applying the copolymers. After the initial screening described in test one, five copolymer solutions (NS-1, NS-2, NS-3, A-5 and A-10) were selected for further evaluation in this second test.

The experimental method consisted of dispersing dry *B. atrophaeus* spores on clean glass slides, followed by an application of either a copolymer solution or air (the control) using a pressurized sprayer. A drying period followed this application to allow sufficient time for the copolymer solution to dry. The glass slides were then exposed to air flow while in a tube and the air stream sampled for resuspended particles with the APS. A more detailed description of the experimental method follows.

The apparatus developed for this method consisted of a dispersion box and resuspension glass tube (25 mm diameter) connected to separate HEPA-filtered compressed air lines. The inlet to the dispersion box was connected to a compressed air line containing an in-line glass frit into which 1-10 mg of spores were placed. Particles were measured during dispersion and resuspension by separate fixed APS probes to obtain a real-time particle size and number. During spore dispersion and resuspension, the APS collected data for two consecutive 30-second intervals. Background particle counts were collected for 30 seconds before each dispersion and resuspension measurement. All glassware was washed in laboratory glassware detergent and rinsed thoroughly in 18.2 MΩ water. Slides were deactivated with 5% solution of dimethyl-dichlorosilane (DMDCS) in methylene chloride.

Spore dispersion consisted of placing three clean, preweighed glass slides (22 mm×75 mm) into the dispersion box and flowing a single pulse (1 sec) of compressed air (2 psi) through the compressed air line, generating an aerosol of spores within the box. APS sampling of the dispersion box provided a relative measure of spore aerosolization. The three slides were then carefully transferred to a platform contained within a glass bell jar.

A spray valve (Model SV1217, I & J Fisnar, Inc., Fairlawn, N.J.) was used to apply copolymer solutions to the slides. This spray valve is designed for low to medium viscosity fluids such that the nozzle orifice, the atomizing pressure of the nozzle and the feed pressure of the reservoir can be controlled to optimize delivery of fluids. A sprayer pressure that would not perturb spores was determined by dispersing spores onto glass slides and then spraying air only at the slides in the spray chamber. Exhaust from the spray chamber was measured for resuspended particles. The difference in the spore count deposited onto the slides was normalized dividing the number of resuspended spores by the number of spores sampled during deposition (FIG. 19). For this study, an atomizing pressure of <10 psi was found not to perturb spores from the slides. All copolymer solutions were sprayed at this pressure and with all other nozzle parameters set to ensure that 500 μl of solution was sprayed into the bell jar within a 1 min application time at a distance of 45 cm.

After spraying was completed, the bell jar was sealed for 15 to 30 minutes, depending on the drying time of the copolymer solutions. The slides were then individually transferred to the dispersion tube. The compressed air line for this tube was opened to a pressure of 15 psi for 1 min at a velocity of 0.87 m/min during which time the air stream was sampled for resuspended particles. Control samples were produced by spraying air onto the slides and waiting 15 minutes before proceeding with the resuspension test. Slides were weighed before aerosol dispersion and after resuspension to determine the amount of applied copolymer solution. Six to eight replicates were conducted for each copolymer solution tested.

Test Three: Copolymer Solution Adhesion Efficiency

The purpose of this test was to compare the adhesion efficiencies of the copolymer solutions on energetically dispersed *B. atrophaeus* spores. Four copolymer solutions were evaluated in the field test conducted at DPG: NS-2, NS-3, A-5 and A-10. Clean galvanized steel coupons (7.62 cm$^2$) were set on the floor in a 2.4 m by 2.4 m mock-office in DPG's Baker building. During the test, the relative humidity and the temperature ranged from 22.7 to 28.8% and 21.1 to 22.8° C., respectively. One gram of fluidized spores was introduced into the airflow using a modified Dixon disseminator (U.S. Army, Dugway, Utah). The disseminator consisted of a metal chamber that contained a measured weight of spores. A diaphragm located over this spore compartment ruptures under an external pulse of pressurized air and results in the near-instantaneous release of spores. The spores were further distributed throughout the office with a room fan for 30 minutes. The spores were allowed to settle overnight. The control sets included an initial spore deposition and a no treatment set retrieved at the end of the test. A water-only spray was used to evaluate the loss of spores due to the airflow created by the sprayer. Each copolymer solution set and each control set included 8 sample coupons.

The copolymer solutions were sprayed onto the coupons from a distance of 61 cm. About 0.5 mL was misted onto each coupon contaminated with spores. The copolymer solutions were allowed 30 minutes to dry, after application on the coupons. After drying, the samples were assayed using the standard swab sampling technique. Sterile polyfiber-tipped swabs (Puritan Medical Products, Co., Guilford, Me.) were moistened with sterile phosphate buffer solution (PBS) and rolled vertically and horizontally over the entire surface of the coupon. Swabs were then placed in a test tube containing 10 mL of PBS with 0.1% TritonX100 (Sigma) and mixed for 10 min on a wrist action shaker. The efficiency of standard swab sampling has been studied by other authors and is not included in this evaluation. Samples were serially diluted, vortexed, and plated on tryticase soy agar (TSA, ATCC Medium 18) in triplicate and incubated at 37° C. for 24 hr.

Test Four: Dry Copolymer Solution Adhesion Strength

The purpose of this test was to determine if airborne spores adhered to dried copolymer solutions. Specifically, the test was designed to determine whether the functional groups of dry copolymer solutions remain available to spores and, if so, the differing adhesion capacities of the dry copolymer solutions. The test apparatus consisted of a 15.2 cm diameter duct, with a total length of 13.7 m, divided into three sections. A vacuum blower drew air into the wind tunnel, through a HEPA filtration system, and into a 2 m section of galvanized steel duct. A modified Stairmand air mixer was placed within the proximal end of the duct to ensure turbulent airflow. An anemometer (Series 2440, Kurz Instruments, Inc., Monterey, Calif.) attached to a personal computer logged the airflow. Airflow through the duct was balanced to 2.83±0.05 m$^3$/min, a standard flow rate in ventilation ducting of this size. The turbulent airflow velocity profile in the 15.2 cm diameter duct was measured 3.05 m from the spore release point (modified Dixon disseminator) with an anemometer.

Sets of six 1.27 cm$^2$ galvanized steel coupons were attached to a flat surface that was inserted into the experimental apparatus. The copolymer solutions were pre-sprayed (~0.1 mL by weigh) on clean coupons using a paint sprayer and inserted into the experimental apparatus. The solutions were allowed to dry on the coupons approximately 30 min. One gram of *B. atrophaeus* spores was released into the airflow. The flow was 100 cfm to achieve 5-air exchanges. The spore cloud moved through the duct in 30 sec, an additional 30 sec of airflow resuspended deposited spores. The sample sets were retrieved and placed into 15 mL test tubes containing 10-mL sterile water and processed using standard culturing methods.

Results of Test One: Spore Adhesion Initial Screening

In general, the copolymer solutions were effective at adhering to the spores in this high velocity airflow (300 cfm) screening test (FIG. 19). Data from viable spore counts recovered from coupons exposed to turbulent airflow suggests the same conclusions from the gravimetric data; most copolymer solutions were effective at retaining spores with the exception of A-8 and A-10 (FIG. 7). The no treatment (NT, control) samples resulted in no measurable particles count. All spores placed on these samples were resuspended and dispersed into the air (FIG. 20 and FIG. 7). Formula A-6 is a thick viscous copolymer solution and was diluted 1:1 with water in order to spray; its weight may be due to the additional weight of dried copolymer. As previously mentioned A-7 was not tested due to the viscous nature of the copolymer solution that made it difficult to spray.

The differences were seen in the viscosity of the solutions and consequential problems with the spray device. A-4 and A-6 were very difficult to spray due to high viscosities (i.e., viscosities>170 cps) and were removed from the list of potential copolymer solution candidates. A-8 did not exhibit good adhesion strength. Despite the poor performance of A-10 in this test, it was retained for further testing because of its electrostatic charge (−0.5 nC/g) and solution viscosity (25 cps). Based on adhesion, viscosity and electrostatic charge NS-1, NS-2, NS-3, A-5 and A-10 were selected for further testing.

Test Two: Aerosolized Spore Resuspension

Copolymer solutions were evaluated by calculating a resuspension ratio using the APS results from the dispersion and resuspension tubes for each slide. The ratio is defined as APS counts$_{resuspension}$/APS counts$_{dispersion}$. It should be noted that APS counts$_{dispersion}$ does not represent the actual number of particles deposited on the slide during dispersion but rather is a measure of the intensity of the spore pulse generated during dispersion. Though not a direct measure of spore deposited on the slide, it is correlated with APS counts$_{resuspension}$ which is a direct measure of resuspension. Because A-5 had a solution viscosity of 171 cps and could not be dispersed using a spray pressure of <10 psi it was not used in this test. The low spray pressure was used because it did not perturb spores that settled on the coupons. The copolymer solutions in this test that best inhibited spore resuspension were NS-2 and NS-3 (FIG. 21).

Test Three: Copolymer Solution Encapsulation Efficiency

Data analysis required the use of the Mann-Whitney test. This nonparametric test allowed for the evaluation of a sample set consisting of less than 100 samples and comparison of the median of two unpaired columns. This test assumes that each value was obtained independently of the others and that the two populations have identically shaped distributions, which are not necessarily Gaussian.

Each sample set treated with a copolymer solution was compared to the no treatment (NT) sample set. The Mann-Whitney U-statistic for NT versus NS-2, NS-3 and A-10 was p=0.0002; a value which is considered extremely significant. The NT versus A-5 comparison yielded p=0.004. Low p values suggest that the data is unlikely to be sampled from populations with equal medians. In this single spray test the copolymer solutions encapsulated between 47 and 59% of the total population of viable spores (FIG. 8).

Approximately 35% of the spores were lost while applying the water spray in this test compared to the NT sample set. The water spray sample set was also significantly different from the copolymer solution treated sample set (p<0.05), with the exception of NS-3 copolymer solution. This was due to the large standard deviation within the sample set. Because the solvent carrier and copolymer differed from solution to solution, the consequential droplet size also varied. With the possible increase in displacement impact, the droplet size may be as important as copolymer adhesion in spore encapsulation and recovery. This field test demonstrated that one of the major differences between four copolymer formulations was their ability to be sprayed and the importance of a low-pressure spray device.

Test Four: Adhesion Strength of Dry Copolymer Solution

The Mann-Whitney test was also used to evaluate data in the wind tunnel tests. Results indicated that the NS-2, NS-3, A-10 and the water spray control samples were all significantly different (p<0.001) from the NT samples (FIG. 9). Airflow at 19.2 m/min resulted in a relatively small number of spores settling on the coupons. NS-2 and A-10 were different from the water spray control samples (p<0.05). A-5 was too viscous (75 cps) and could not be sprayed by the paint sprayer used for these tests. These samples were analyzed by extracting the spores off the test coupons; therefore, samples with a high spore recovery are considered better than those with a lower spore recovery.

Discussion of Experimental Results from Article

Four experiments were performed to evaluate the capacity of the set of copolymer solutions to immobilize biothreat particles in comparison to other copolymer solutions. In particular, the copolymer solutions' adhesion strength was challenged using multiple test configurations. During the evaluation it became apparent that the ability to spray a viscous solution was a limiting factor in the test methodology. Several of the copolymer solutions possessed qualities that allowed for their even application and with a low interfacial tension. Other solutions demonstrated good adhesion strength under conditions of high airflow.

Although these adhesion tests primarily sought to select copolymer solutions that minimized particle resuspension after solution application, the selection criteria also required other key factors. These included the ability to mist in a spraying device, a neutral pH, a negative electrostatic charge and low solution surface tension.

It is of interest to establish how much moisture remains in these polymers after spraying and the extent of water's interaction with the copolymer because this could trigger dimensional changes in the spore. The moisture analysis of the copolymer solutions after spraying was calculated from the evaporation endotherm indicating that most copolymer solutions tested retain about 5-10% moisture.

The results of the screening test (Test one) provided a basis to down select from eight of the copolymer solution formulations to only five. The five that were selected had suitable viscosity, electrostatic spore charge and spore-adhesion qualities. Test two evaluated single-spore resuspension, and results suggest that NS-2 and NS-3 copolymer solutions resulted in fewer particles resuspending in airflow of 0.87 m/min. The method of application proved to be an important experimental parameter. In FIG. 19 the spray pressure that did not perturb spores on the surfaces was <10 psi at a distance of 45 cm. With the possibility of increasing the spore displacement impact with airflow or by the droplet size these experimental parameters proved to be critical. The droplet size and contact angle may be as important as copolymer adhesion in spore encapsulation and recovery. Test Three evaluated the copolymer solution and spore adhesion strength in an environment with energetically dispersed weaponized spores. Recovery of viable spores ranged from 47 to 59% with a single application of the copolymer solution. Test Four was to determine if airborne spores would adhere to dried copolymer solution in an active airflow. This test was to evaluate the copolymer functional groups activity after surface application. NS-2 was the most effective material in this test.

In each adhesion test conducted for this study, NS-2 was one of the top performing copolymer solutions (FIG. 8) and met all selection criteria requirements (FIGS. 2 and 3). The NS-2 copolymer solution was found to be useful for the immobilization of hazardous biological particles in laboratory and field tests. It is appreciated that an additional alternative embodiment of the copolymer formula can include sporicide/biocide/fungicide in polymer binding agent. Additional alternative embodiment: The addition of a phosphor will facilitate easy visualization of spray pattern, clean up or decontamination.

Using the copolymer solutions described above, an area contaminated with a biothreat agent may be restored using a two-step method, first immobilize the contaminant, then decontaminate the area. In particular, immobilization may be performed by fogging or spraying the copolymer solution into the air or onto surfaces. This two-step approach may allow increased flexibility in choosing a decontamination agent appropriate for the microorganism and the surface substrate while reducing further dispersion of the biothreat. This could result in better recovery for sensitive equipment including electronics.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of inhibiting re-aerosolization and transport of aerosol and aerosolizable particles, comprising:
    applying a copolymer solution to said particles, said copolymer solution comprising: a solvent selected from the group consisting of water, and ethanol and water mixture; and a copolymer dissolved in said solvent so that said copolymer solution has low viscosity of less than 50 cps and low surface tension of less than 60 dynes/cm,
    for coagulating aerosol and aerosolizable particles when applied thereon and adhering said particles to a surface.
2. The method of claim 1,
wherein the solution is applied as an aerosol.
3. The method of claim 1,
wherein the solution is applied as a spray.
4. The method of claim 1,
wherein the solution is applied as a coating.
5. The method of claim 1,
wherein the solution is applied to suspended aerosol particles.
6. The method of claim 1,
wherein the solution is applied to a surface having aerosolizable particles thereon.
7. The method of claim 1,
wherein said solvent is about 1:2 ethanol to water mixture.
8. The method of claim 1,
wherein said copolymer solution additionally has a negative electrostatic charge.
9. The method of claim 8,
wherein said copolymer solution additionally has a substantially neutral pH, and low pKa of less than 7.
10. The method of claim 9,
wherein said copolymer has a set of functional groups comprising OAm, AA-AMP, and BAEMA.
11. The method of claim 1,
wherein said copolymer solution further comprises at least one additive dissolved in the solvent, said additive being at least one of decontamination agent, inhibitor, and fluorescent agent.

* * * * *